(12) United States Patent
Yamakawa et al.

(10) Patent No.: US 6,208,488 B1
(45) Date of Patent: Mar. 27, 2001

(54) MAGNETIC TAPE APPARATUS

(75) Inventors: Kengo Yamakawa, Kawasaki (JP); Makoto Sasaki, Longmont, CO (US)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 09/431,484

(22) Filed: Nov. 2, 1999

(30) Foreign Application Priority Data

Nov. 2, 1998 (JP) .................................................. 10-311895

(51) Int. Cl.$^7$ ....................................................... G11B 5/41
(52) U.S. Cl. ............................................................. 360/128
(58) Field of Search ..................................... 360/128, 122, 360/69, 137, 84, 85, 95; 15/DIG. 12, DIG. 13; 242/352.4, 348, 348.3, 332.4

(56) References Cited

U.S. PATENT DOCUMENTS

| | | | |
|---|---|---|---|
| 4,851,945 | * 7/1989 | Fritsch et al. | 360/128 |
| 5,155,639 | * 10/1992 | Platter et al. | 360/95 |
| 5,473,493 | * 12/1995 | Kusui | 360/128 |
| 5,742,461 | * 4/1998 | Benson et al. | 360/128 |
| 5,930,089 | * 7/1999 | Anderson | 360/128 |
| 5,949,629 | * 9/1999 | Suzuki et al. | 360/128 |
| 6,067,211 | * 5/2000 | Chliwnyj et al. | 360/128 |

* cited by examiner

*Primary Examiner*—David L. Ometz
*Assistant Examiner*—Tianjie Chen
(74) *Attorney, Agent, or Firm*—Greer, Burns & Crain, Ltd.

(57) ABSTRACT

A magnetic tape apparatus has a magnetic tape in a cartridge that is pulled out and travels, and data is read from and written into the travelling magnetic tape by a magnetic head. The centers of rotation of a first arm and a second arm which move together are arranged on the side of the cartridge and on the side of the machine reel, respectively, relative to the magnetic head, and a cleaning member such as a brush that comes into contact with the magnetic head is provided on at least one of the rotating ends of the two arms. The cleaning mechanism occupies small space, and the magnetic tape apparatus is realized in a small size.

5 Claims, 12 Drawing Sheets

MAGNETIC TAPE APPARATUS

BACKGROUND OF THE INVENTION

1. Field of the Invention

The present invention relates to a magnetic tape apparatus in which a magnetic tape in a cartridge is pulled out and travels and data is read from and written to the travelling magnetic tape by a magnetic head.

2. Description of the Related Art

The magnetic tape apparatus has been widely used as, for example, a backup subsystem for a computer and it has been strongly desired to provide the magnetic tape apparatus in a reduced size to save space. If realized in a small size, the magnetic tape apparatus can be used in a desktop apparatus eliminating the need for maintaining space exclusively for the magnetic tape apparatus. Further, in a magnetic tape apparatus in a library apparatus having a mechanism for automatically exchanging the cartridges, the magnetic tape apparatus which is an engine of a small size helps enhance the efficiency for accommodating the magnetic tapes and contributes to increasing the continuous storage processing capacity.

In the magnetic tape apparatus of this type, the magnetic tape in the cartridge is pulled out by a threader mechanism, anchored to a machine reel, and permitted to travel, so that the data are read out from, or written into, the magnetic tape by a magnetic head. While travelling, the magnetic tape comes into sliding contact with the magnetic head, whereby dust produced from the magnetic tape and the like adheres onto the magnetic head due to the sliding contact. The dust must be removed since it may deteriorate the recording/reproducing characteristics. Therefore, the magnetic head has heretofore been cleaned by bringing a cleaning member such as brush or the like into contact with the magnetic head.

Here, in a state where the magnetic tape is wrapped round the magnetic head, it is not possible to clean the magnetic head, and the cleaning member that is located close to the magnetic head hinders the travelling of the magnetic tape. Therefore, a constitution has been contrived in which, when the magnetic tape is being wrapped round the magnetic head, the cleaning member is brought in a retracted position away from the magnetic head, and when the magnetic tape is no longer wrapped round the magnetic head, the cleaning member moves toward the magnetic head to come in contact with the magnetic head.

More specifically, when the magnetic tape in the cartridge is pulled out by a threader mechanism, a swing arm having the cleaning member attached thereto is pushed by the threader mechanism to move the cleaning member to the retracted position away from the magnetic head, and when the magnetic tape is accommodated in the cartridge, the swing arm having the cleaning member is pushed in the reverse direction to move the cleaning member to a position where it comes in contact with the magnetic head.

In the accompanying drawings, FIG. 12 is a plan view illustrating a cleaning mechanism and a rough arrangement in the vicinity thereof in a conventional magnetic tape apparatus, FIG. 13 is a plan view of a swing arm in FIG. 12, and FIG. 14 is a perspective view illustrating a cartridge.

The magnetic tape is wound in the cartridge, and a leader block 1 is attached to the end of the magnetic tape as shown in FIG. 14. The cartridge is inserted in the magnetic tape apparatus through a cartridge insertion port.

The threader mechanism that is not shown has a threader arm for pulling the magnetic tape out, and a threader pin 2 (see FIG. 12) is provided at the end of the threader arm to engage with the leader block 1. The threader pin 2 moves along a track T indicated by a dot-dash chain line in FIG. 12, to pulls the magnetic tape out and causes it to be anchored to a machine reel that is not shown. This mechanism has been widely known.

FIG. 12 illustrates a state where the magnetic tape is being pulled out, and a swing arm 3 is arranged so as to intersect the track T. The swing arm 3 is rotatably supported by a hinge pin 5 so that the center of rotation is at a position striding over the track T relative to the magnetic head 4 and deviated toward the direction of the track on the side of the cartridge.

In addition, though not diagramed, the swing arm 3 has a mechanism incorporated therein which forcibly causes the swing arm 3 to select, as stable positions, either an approach position at which it intersects the track T and an intermediate portion 3a thereof approaches the magnetic head 4 (position shown in FIG. 12) or a retracted position at which it is pushed back in a direction in which it does not intersect the track T toward the retracted position, in other words, it has a mechanism which expels the swing arm toward either the approached position or the retracted position with the intermediate position therebetween as a boundary.

Referring to FIG. 13, a brush 7 which is a cleaning member is attached to the intermediate portion 3a of the swing arm 3 by using an engaging pin 6. In the state shown in FIG. 12, the brush 7 is in contact with the magnetic head 4. An elongated extension 3b forming an end of the swing arm 3 intersects the track T when the swing arm 3 is at the approach position, and an arch-like extension 3c forming the other end of the swing arm 3 intersects the track T when the swing arm 3 is at the retracted position. A fitting hole 3d for being fitted onto the hinge pin 5 is made in a boundary portion between the arch-like extension 3c and the intermediate portion 3a.

In this magnetic tape apparatus, the magnetic tape is drawn from the cartridge and the threader pin 2 is brought into a position shown in FIG. 12 so as to come into contact with the intermediate portion 3a of the swing arm 3 at the approach position thereby to push it. Therefore, the swing arm 3 turns clockwise. As the threader pin 2 passes on the track T near the magnetic head 4, the swing arm 3 moves to the retracted position whereby the magnetic tape is wrapped round the magnetic head 4 and tape guides 8 and 9.

Then, the threader pin 2 causes the leader block to be anchored onto the machine reel. FIG. 15 illustrates a state where the swing arm 3 has moved to the retracted position. In this state, the brush 7 does not come into slide contact with the magnetic tape; i.e., the magnetic tape is permitted to run so that the data are read out or written by the magnetic head.

To accommodate the magnetic tape in the cartridge after the data have been read out or written, the leader block is separated from the machine reel, and the magnetic tape is wound into the cartridge. At this moment, the threader pin 2 moves together with the leader block toward the cartridge. The magnetic tape that is to be accommodated in the cartridge is rewound in a state shown in FIG. 15. Therefore, the threader pin 2 that has arrived at the position shown in FIG. 15 comes in contact with the arch-like extension 3c of the swing arm 3 at the retracted position and pushes it. Therefore, the swing arm 3 turns counterclockwise.

As the threader pin 2 passes through the track T near the swing arm 3, the swing arm 3 returns back to the approach position shown in FIG. 12, and the brush 7 comes into contact with the magnetic head 4 again. The magnetic tape is accommodated in the cartridge.

Even when the swing arm 3 remains at the retracted position due to some cause at a moment when the magnetic tape is about to be pulled out from the cartridge, the threader pin 2 proceeds to push the arch-like extension 3c back to arrive at the intermediate portion 3a without trouble.

Conversely, even when the swing arm 3 remains at the approach position, for to some reason, at a moment when the magnetic tape is about to be accommodated in the cartridge, the threader pin 2 proceeds to push the elongated extension 3b back to pass on the track near the magnetic head 4 without trouble.

The brush 7 must be moved by more than a predetermined amount irrespective of the size of the magnetic tape apparatus. In the above-mentioned magnetic tape apparatus, the moving amount of the brush 7 is obtained by the turning of the swing arm 3. Here, the swing arm 3 has the elongated extension 3b and the arch-like extension 3c on both sides of the center of rotation and, hence, it is not allowed to move the hinge pin 5 far from the magnetic head 4. In order to move the brush 7 by a required amount, therefore, the swing arm 3 must turn by a greater amount.

In the case of the above-mentioned magnetic tape apparatus, however, the swing arm 3 has a large radius of gyration and, particularly, needs a large distance between the hinge pin 5 which is the center of rotation and the end of the elongated extension 3b. Therefore, an increased space of motion is occupied by the elongated extension 3b. Therefore, the cleaning mechanism, too, occupies an increased space making it difficult to realize the magnetic tape apparatus in a small size.

SUMMARY OF THE INVENTION

The present invention was accomplished in view of the above-mentioned problems, and its object is to realize a magnetic tape apparatus in which a cleaning mechanism occupies a small space enabling the size of the magnetic tape apparatus to be decreased.

The magnetic tape apparatus according to the present invention comprises a threader mechanism for pulling out a magnetic tape in a cartridge by a threader arm along a predetermined track and anchoring it to a machine reel; a magnetic head for reading data from and writing data into the magnetic tape; a first arm having a center of rotation at a position displaced toward said cartridge relative to said magnetic head in the direction of the track, and, upon the rotation thereof, being able to assume an approach position where it intersects with said track so that a rotating end thereof approaches said magnetic head and a retracted position where it is pushed back in a direction in which it does not to intersect with said track; a second arm having a center of rotation at a position displaced toward said machine reel relative to said magnetic head in the direction of the track, and movable with said first arm to assume an approach position where it intersects with said track so that a rotating end thereof approaches said magnetic head and a retracted position where it is pushed back in a direction in which it does not intersect with said track; a cleaning member movable with the rotating ends of said first and second arms and contacting said magnetic head when said first and second arms are at said approach position; and said first arm being pushed by said threader mechanism to return back to said retracted position when the magnetic tape is being pulled out from said cartridge.

In this constitution, the centers of rotation of the first arm and the second arm which move together are disposed on the side of the cartridge and on the side of the machine reel, respectively, relative to the magnetic head, and the cleaning member that can be brought into contact with the magnetic head is provided in at least either one of the rotary ends of the two arms. Accordingly, the rotating ends of the first and second arms are moved by an amount nearly the same as the amount of the movement of the cleaning member. Therefore, the first and second arms move in a small space, and the cleaning mechanism occupies a small space, making it possible to decrease the size of the magnetic tape apparatus.

Preferably, the first arm has a center of rotation at a position over the track relative to the magnetic head and displaced toward the cartridge from the magnetic head in the direction of the track, and the second arm has the center of rotation at a position over the track relative to the magnetic head and displaced toward the machine reel from the magnetic head in the direction of the track.

By so selecting the centers of rotation, the rotating ends of the first and second arms may be simply arranged, and directed toward the magnetic head, so that the first and second arms are allowed to easily intersect the track of the threader mechanism.

In addition, the magnetic tape apparatus according to the present invention comprises: a threader mechanism for pulling out a leader block of a magnetic tape in a cartridge by a threader arm along a predetermined track and anchoring it to a machine reel; a magnetic head for reading data from and writing data into the magnetic tape; a first arm having a center of rotation at a position over said track relative to said magnetic head and displaced toward said cartridge from the magnetic head in the direction of the track, and, upon rotation thereof, being able to assume an approach position where it intersects with said track so that a rotating end thereof approaches said magnetic head and a retracted position where it is pushed back in a direction in which it does not intersect said track, said first arm being pushed by said threader arm to return to said retracted position when the magnetic tape is being pulled out from said cartridge; a second arm having a center of rotation at a position over said track relative to said magnetic head and displaced toward said machine reel from the magnetic head in the direction of the track, and having a rotating end engaged with the rotary end of said first arm to move with said first arm and being able to assume an approach position where it intersects with said track so that the rotating end thereof approaches said magnetic head and a retracted position where it is pushed back in a direction in which it does not intersect said track; a third arm which, is located at a position to intersect with a portion of said track on the side of said cartridge rather than the said first arm when said first arm is at said retracted position, and is pushed and displaced by said threader arm so that this movement is transmitted to said first arm to move said first arm moved to said approach position when the magnetic tape is accommodated in said cartridge; and a cleaning member provided on the rotating end of at least one of said first arm and said second arm to come into contact with said magnetic head when said first and second arms are at said approach position.

In this constitution too, the rotating ends of the first and second arms are moved by the amount nearly the same as the amount of the movement of the cleaning member. Therefore, the first and second arms move in a small space, and the cleaning mechanism occupies a small space, making it possible to decrease the size of the magnetic tape apparatus. Further, the first and second arms are allowed to easily intersect the track. Upon providing the third arm, further, the first and second arms can be moved to the approach position relying on the force of the threader arm at the time when the magnetic tape is to be accommodated in the cartridge.

Preferably, the first and third arms have centers of rotation that are in agreement with each other and are arranged in a V-shape, the spreading angle between the two being limited in a predetermined range, the third arm rotating by receiving a force from the threader arm in a direction to broaden the spreading angle relative to the first arm, so that the first arm moves to said approach position when the magnetic tape is to be accommodated.

Even when the first and second arms are at the retracted positions and the third arm is intersecting the track, for to some reason, at the time when the magnetic tape is to be just pulled out from the cartridge, the third arm rotates in a direction to decrease the spreading angle. Therefore, the threader arm proceeds to push the third arm back without any trouble.

Preferably, a resilient force is imparted between the first arm and the third arm in a direction to increase the spreading angle between the two, so that the spreading angle between the first arm and the third arm becomes a maximum in a natural state where no external force is exerted.

BRIEF DESCRIPTION OF THE DRAWINGS

The present invention will become more apparent from the description of the following embodiments taken in conjunction with the accompanying drawings wherein.

DESCRIPTION OF THE PREFERRED EMBODIMENTS

Figure 1:
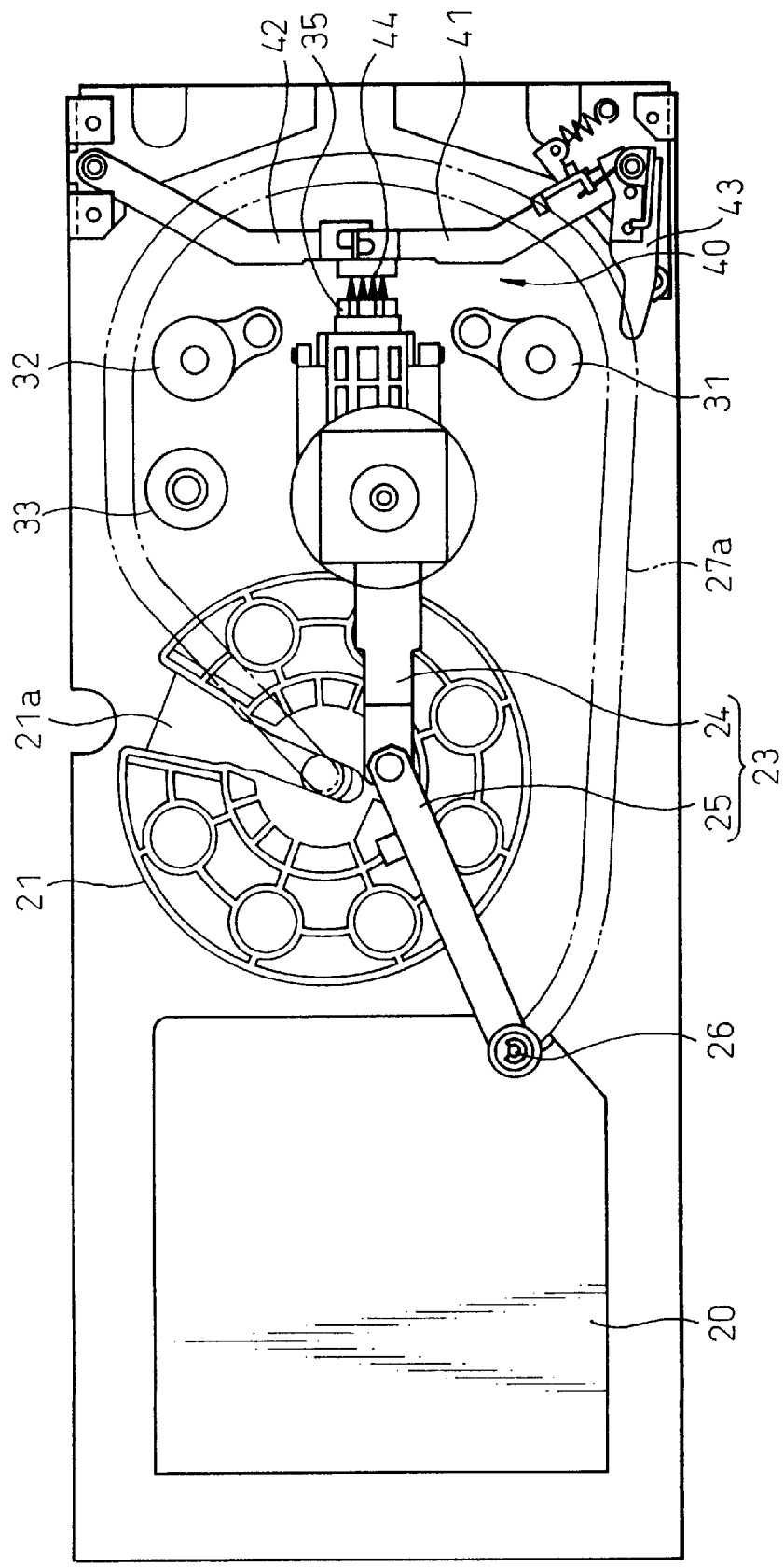
FIG. 1 is a plan view illustrating the internal constitution of a magnetic tape apparatus according to an embodiment of the present invention.
Figure 2:
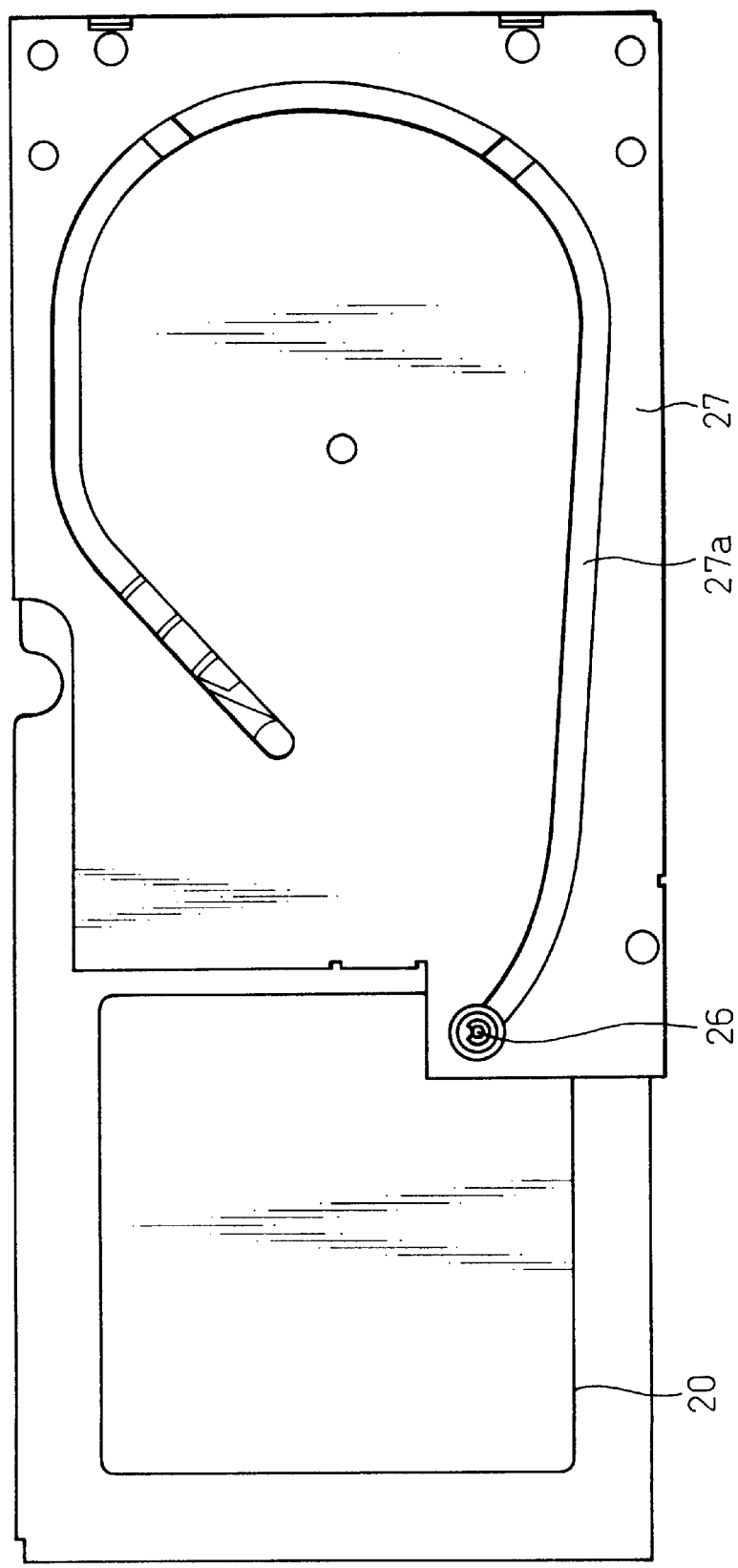
FIG. 2 is a plan view of the embodiment of FIG. 1 before the guide plate is removed.

FIG. 1 is a plan view illustrating the internal constitution of the magnetic tape apparatus according to an embodiment of the present invention, and FIG. 2 is a plan view of the apparatus before a guide plate is removed.

The internal constitution according to this embodiment has a feature in that the mechanism for cleaning the magnetic head, and the mechanism in which a cartridge is loaded and the magnetic tape is pulled out to read and write the data, are similar to that of the magnetic tape apparatus that has been widely known thus far.

Figure 14:
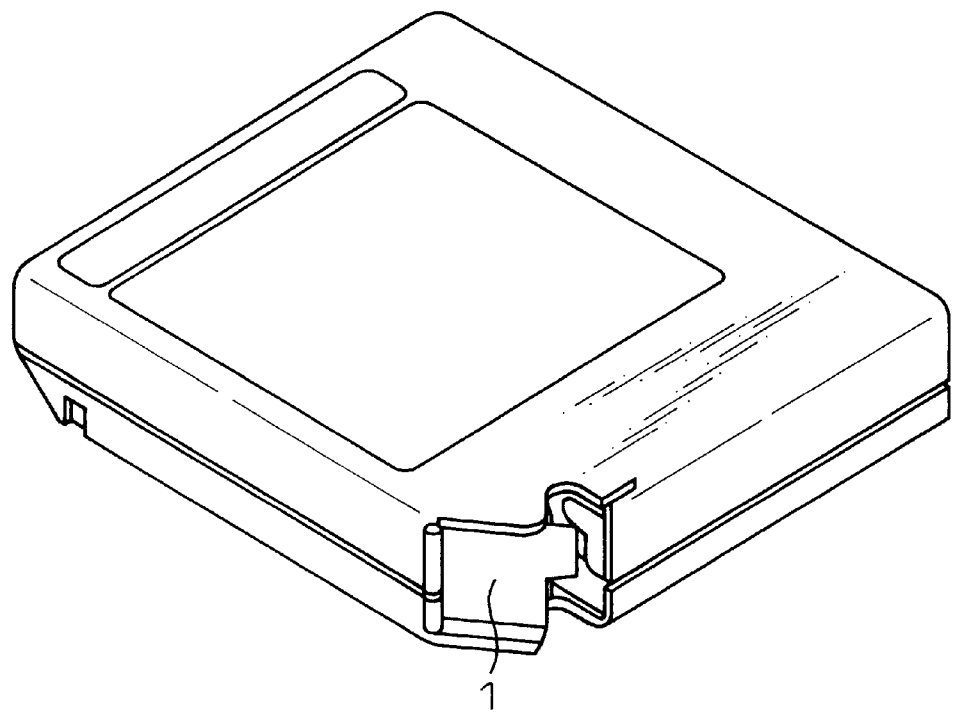
FIG. 14 is a perspective view of the cartridge.
Figure 15:
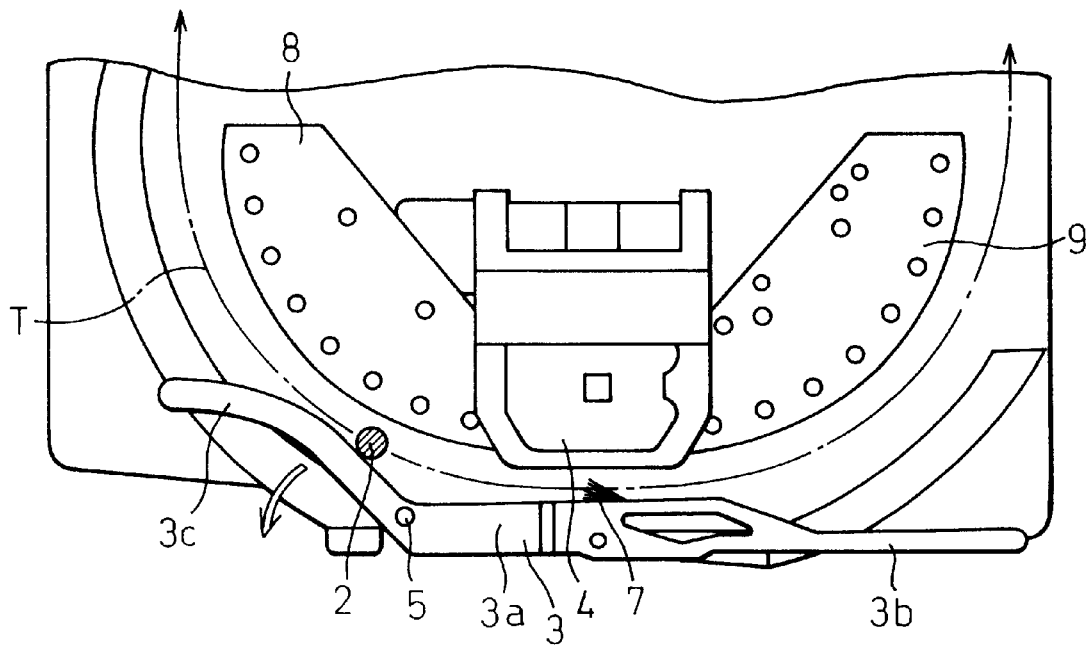
FIG. 15 is a plan view illustrating the apparatus of FIG. 12 in another operation state.

First, a cartridge 20 has a similar constitution to that shown in FIG. 14, and includes a magnetic tape wound therein with a leader block attached to an end of the magnetic tape. The cartridge 20 is inserted in the magnetic tape apparatus through a cartridge insertion port that is not shown. A loader portion that is not shown is provided on the inner side of the cartridge insertion port. The loader portion works to set the inserted cartridge 20 to a loading position or to discharge the cartridge.

The machine reel 21 has a groove 21a in which a leader bock is fitted, and is actuated for rotation by a machine reel motor that is not shown. The threader mechanism 23 comprises a rotary arm 24 driven by a threader motor, and a threader arm 25 which is rotatably attached at its one end to a rotary end of the rotary arm 24 and is provided with a threader pin 26 at the other end thereof.

The threader pin 26 engages with the leader block of the cartridge 20 that has arrived at the loading position, and is fitted, via a bearing that is not shown, to a track (annular guide groove) 27a of a guide plate 27 that is shown in FIG. 2. As the threader pin 26 moves along the track 27a, the leader block is pulled out from the cartridge 20 and is fitted to the groove 21a of the machine reel 21.

As a result, the magnetic tape is wrapped round the roller guides 31, 32 and 33, and fitted in the machine reel 21. A magnetic head 35 is located between roller guides 31 and 32, and is provided with a read gap and a write gap, to read out data from and write data into the magnetic tape. The magnetic head 35 according to this embodiment is arranged so that it can be moved in the direction of width of the magnetic tape at the time of cleaning the magnetic head.

Figure 3:
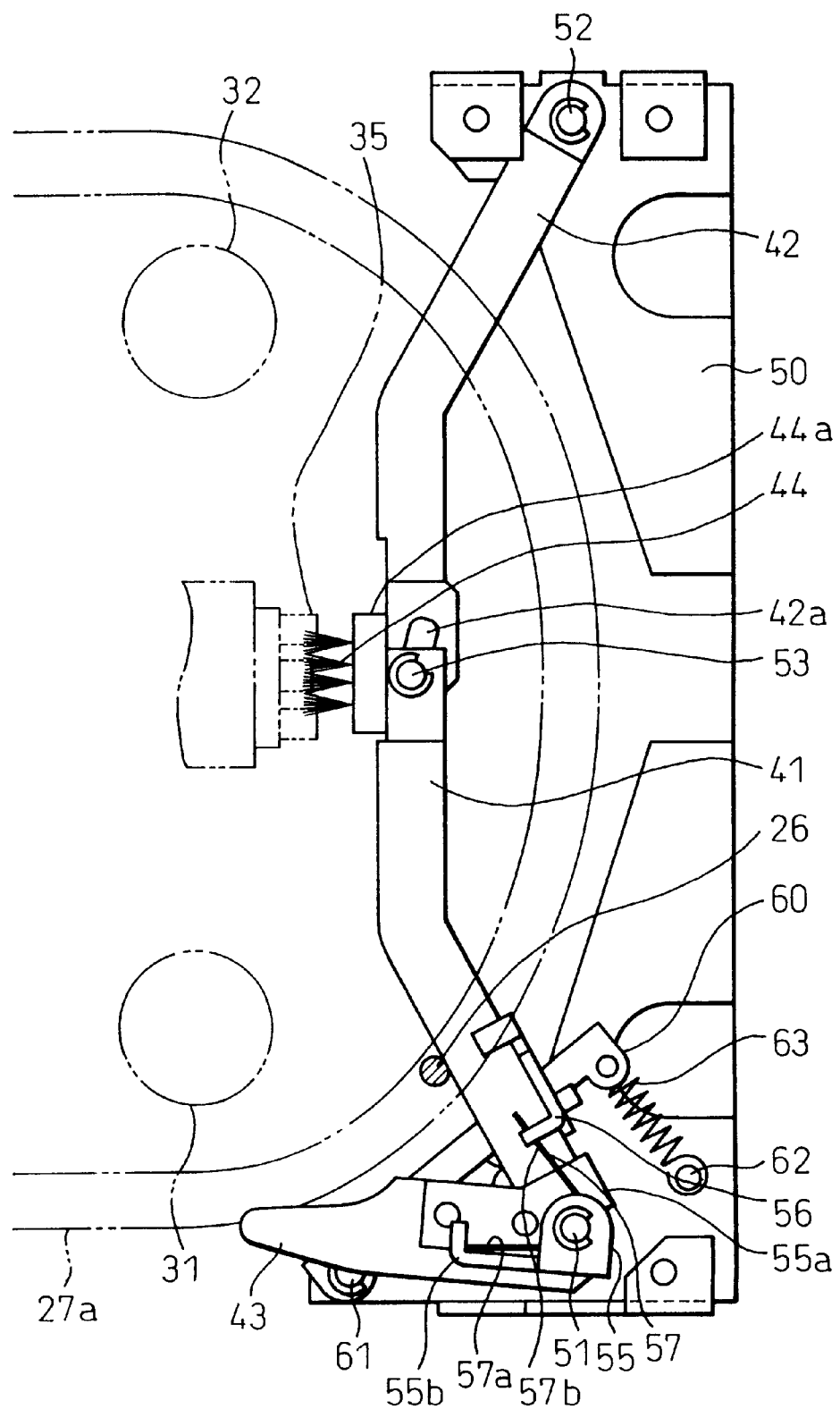
FIG. 3 is a plan view illustrating in detail the constitution of the cleaning mechanism of FIG. 1.
Figure 4:
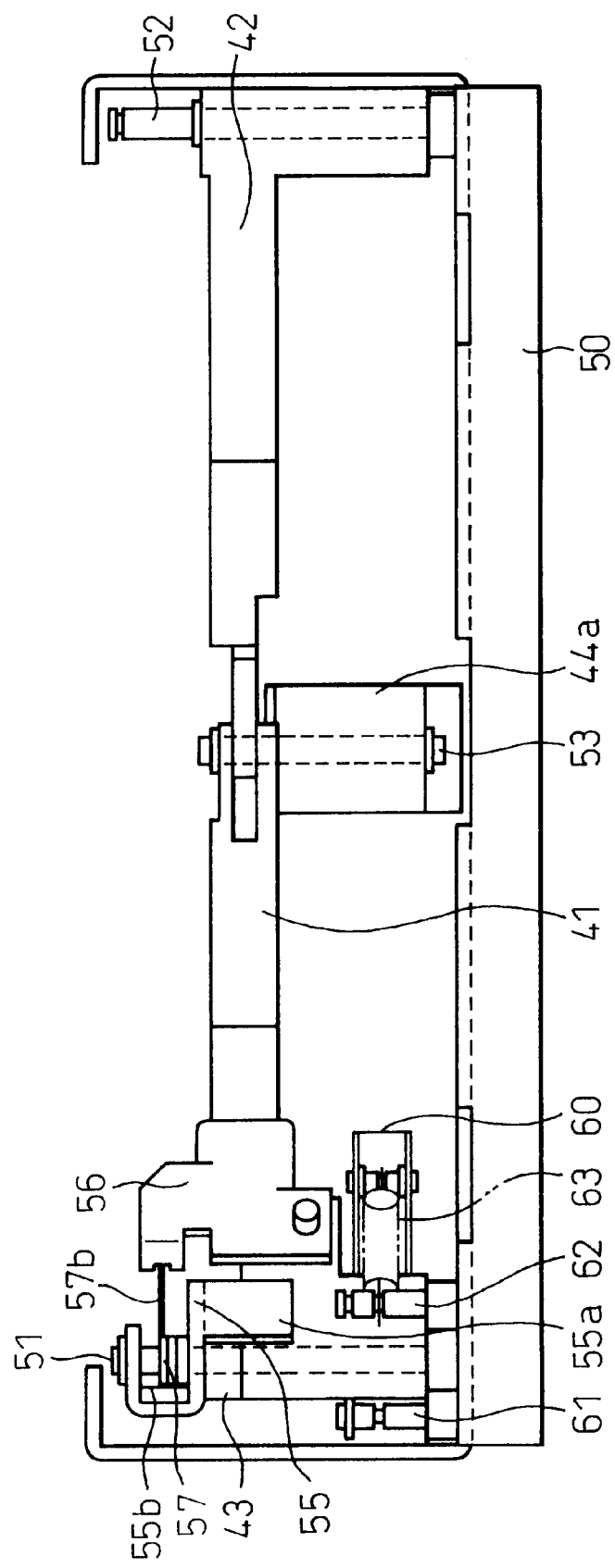
FIG. 4 is a right side view illustrating in detail the cleaning mechanism of FIG. 1.
Figure 5:
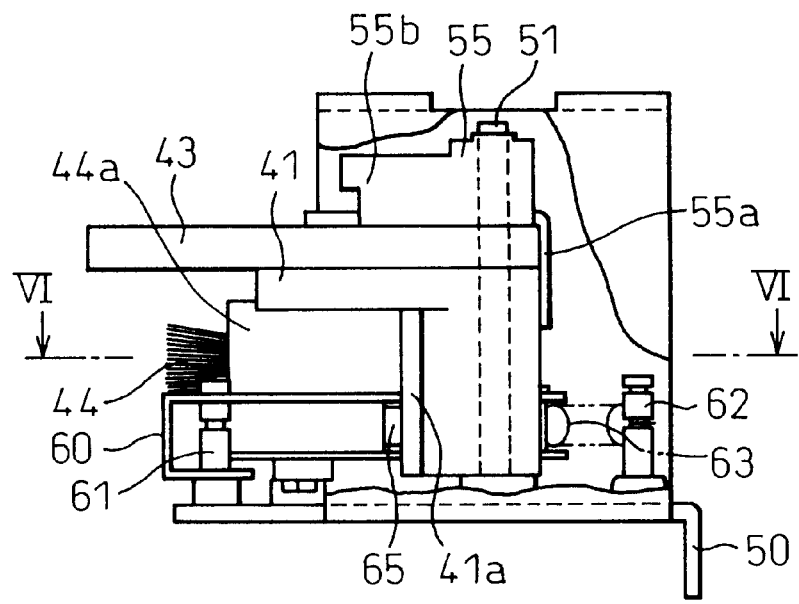
FIG. 5 is a front view illustrating in detail the constitution of the cleaning mechanism of FIG. 1.
Figure 6:
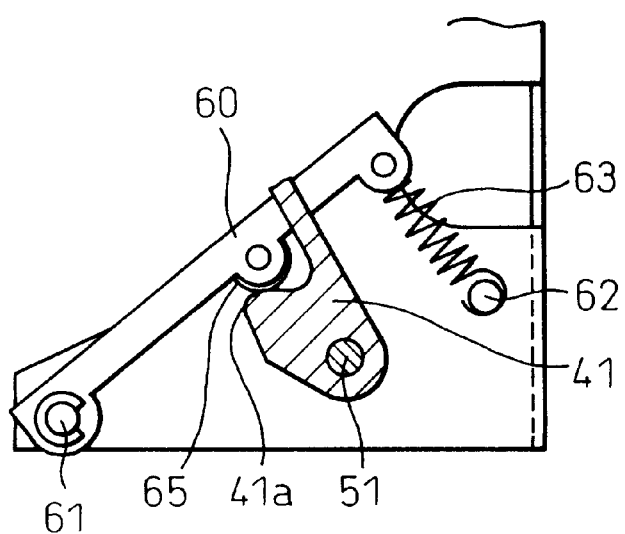
FIG. 6 is a sectional view of the major portion, taken along the line VI—VI in FIG. 5.

A cleaning mechanism 40, which cleans the magnetic head 35, comprises a first arm 41, a second arm 42, a third arm 43, a brush 44 and the like. FIGS. 3 to 6 illustrate, in detail, the constitution of the cleaning mechanism 40, wherein FIG. 3 is a plan view, FIG. 4 is a right side view, FIG. 5 is a front view, and FIG. 6 is a sectional view of the major portion, taken along the line X—X in FIG. 5.

As will be understood from these drawings, a first shaft 51 is arranged upright on a base plate 50 at a position over the track (guide groove) 27a relative to the magnetic head 35 and displaced toward the cartridge 20 from the magnetic head 35 in the direction of the track. Further, a second shaft 52 is arranged upright on the base plate 50 at a position over the track 27a relative to the magnetic head 35 and displaced toward the machine reel 21 from the magnetic head 35 in the direction of the track.

The first and second shafts 51 and 52 serve as centers of rotation for the first and second arms 41 and 42, and the proximal ends of the first and second arms 41 and 42 are rotatably supported by the first and second shafts 51 and 52. The rotating ends of the first and second arms 41 and 42 are engaged with each other so as to move in the transverse direction in FIG. 3.

In particular, the rotating end of the second arm 42 is provided with an elongated hole 42a extending in the direction of the second shaft 52, and a pin 53 movably inserted in the elongated hole 42a is anchored to the first arm 41. The pin 53 extends toward the right in FIG. 4, and a support block 44a on which a brush 44 is implanted is attached thereto. Accordingly, the brush 44 moves integrally with the rotating end of the first arm 41.

The third arm 43 positioned on the side of the cartridge 20 from the first arm 41 is supported by the first shaft 51 so as to rotate in a manner such that the center of rotation thereof is in agreement with the first arm 41. Further, a support bracket 55 is rotatably mounted to the end of the first shaft 51 by which the first arm 41 and the third arm 43 are supported one on another.

The support bracket 55 is secured to the third arm 43, and a stopper portion 55a of the support bracket 55 extending toward the right in FIG. 4 is allowed to come in contact with the side surface of the first arm 41. Due to the provision of the stopper portion 55a, the spreading angle between the first arm 41 and the third arm 43 arranged in a V-shape is limited in a predetermined range.

The support bracket 55 further has a hook portion 55b. Ends 57a and 57b of a torsion spring 57 fitted to the first shaft 51 are engaged with the hook portion 55b and a hook 56 secured to the base proximal end of the first arm 41.

Therefore, the spreading angle between the first arm 41 and the third arm 43, in a natural state where no external force is given, is equal to an angle in a state where the stopper portion 55a of the support bracket 55 is in contact with the side surface of the first arm 41, i.e., equal to a maximum spreading angle. When an external force is exerted on the first arm 41 or on the third arm 43 in a direction to increase the spreading angle between the two, the first arm 41 and the third arm 43 always rotate together, and when an external force is exerted in a direction to decrease the spreading angle, these arms are displaced relative to each other in a direction in which the spreading angle decreases, provided the external force is greater than the resilient force of the torsion spring 57.

A pushing arm 60 is arranged to intersect the first arm 41, and is rotatably supported at its one end by a third shaft 61 erected on the base plate 50. The other end of the pushing arm 60 is urged toward the first shaft 51 by a tension spring 63 hooked between it and a fourth shaft 62 erected on the base plate 50.

Referring to FIG. 6, a roller 65 is supported at an intermediate portion of the pushing arm 60. A triangular prism portion 41a is formed on a thickly formed proximal end of the first arm 41, which comes in contact with the roller 65. Depending on the contact of the roller 65 with either one of the inclined surfaces on both sides of the vertex of the triangular pole portion 41a as a boundary, therefore, the direction of the rotational urging force given by the pushing arm 60 to the first arm 41 is reversed. At a position shown, for example, in FIG. 6, the first arm 41 is urged in the counterclockwise direction, and when the roller 65 is contacting the other inclined surface, the first arm 41 is urged in the clockwise direction.

In this embodiment, the roller 65 comes into contact with different inclined surface on the triangular prism portion 41a, depending on whether they are at the approach position (shown in FIG. 3) where the first and second arms 41 and 42 intersect the track 27a so that the rotating ends thereof approach the magnetic head 35 or at the retracted position (shown in FIG. 9) where the first and second arms 41 and 42 are pushed back in a direction in which they do not intersect the track 27a.

Accordingly, the first and second arms 41 and 42 that move together are urged by the pushing arm 60 to one of the two stable positions, i.e., to either the approach position or the retracted position. When the first and the second arms 41 and 42 are at the retracted position, the third arm 43 protrudes up to a position where it intersects a portion of the track 27a on the side of the cartridge 20 from the side of the first arm 41. The approach position and the retracted position of the first and second arms 41 and 42 are the positions where the pin 53 comes in contact with the inner wall surface on the end side of the elongated hole 42 in the second arm 42 (lower inner wall surface in FIG. 3).

The thus constituted magnetic tape apparatus operates as described below. First, in the initial state, the first and second arms 41 and 42 are at the approach position. The machine reel 21 moves to a position where the groove 21a thereof overlaps the track 27a. When the cartridge 20 is inserted in the cartridge insertion port in this state, the cartridge 20 is moved to the loading position, and the leader block engages with the threader pin 26 that is standing by at a predetermined position.

Next, the rotary arm 24 rotates counterclockwise in FIG. 1, the threader arm 25 follows this rotation, and the threader pin 26 pulls the leader block out from the cartridge 20. The threader pin 26, pulling out the magnetic tape, arrives at a position shown in FIG. 3 and comes into contact with the first arm 41 to push it. Therefore, the first arm 41 rotates clockwise and, being interlocked thereto, the second arm 42 rotates counterclockwise.

Figure 7:
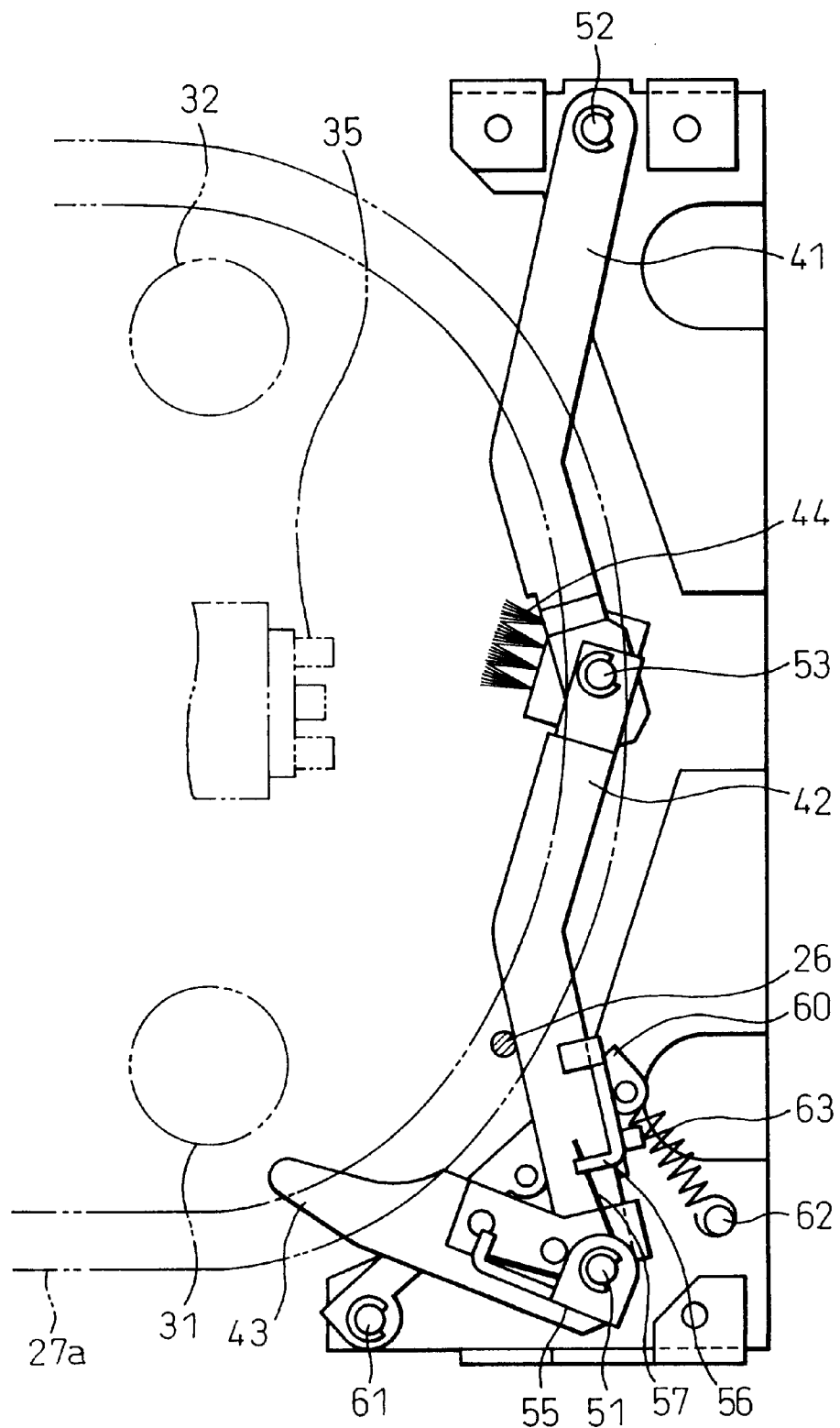
FIG. 7 is a plan view illustrating the cleaning mechanism shown in FIG. 3 in another operation state.
Figure 8:
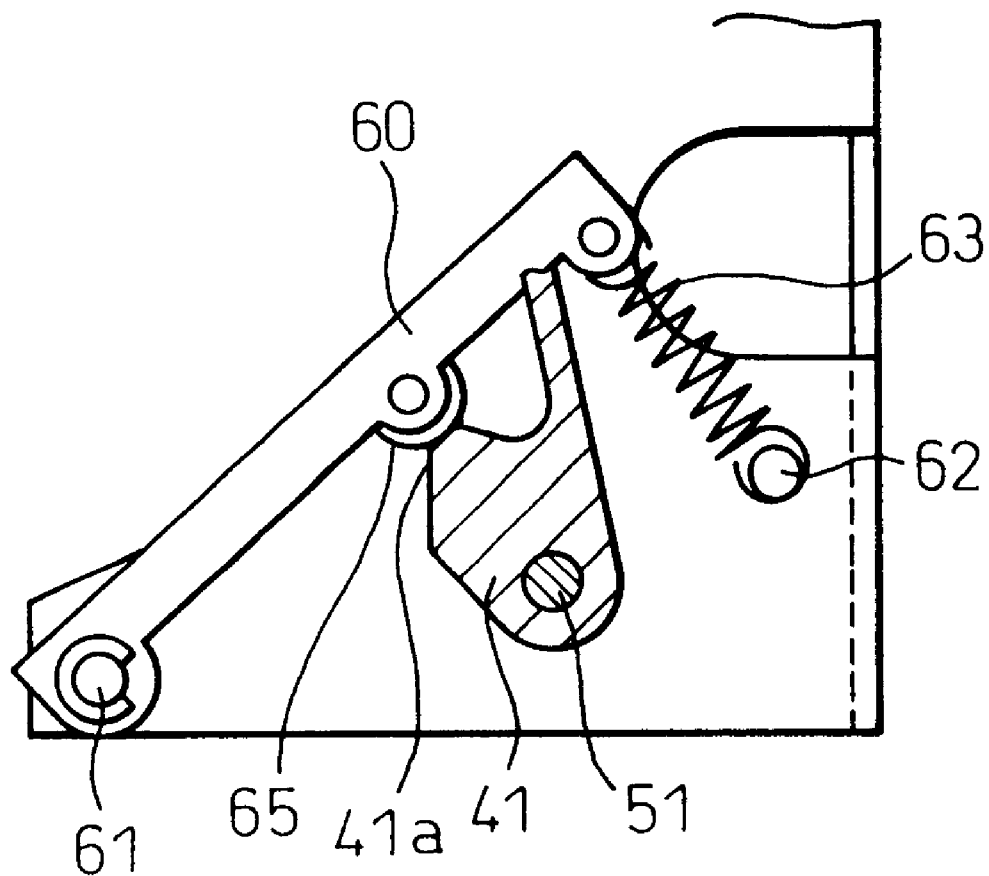
FIG. 8 is a sectional view of the major portion in the state of FIG. 7, taken along the line VI—VI in FIG. 5.
Figure 9:
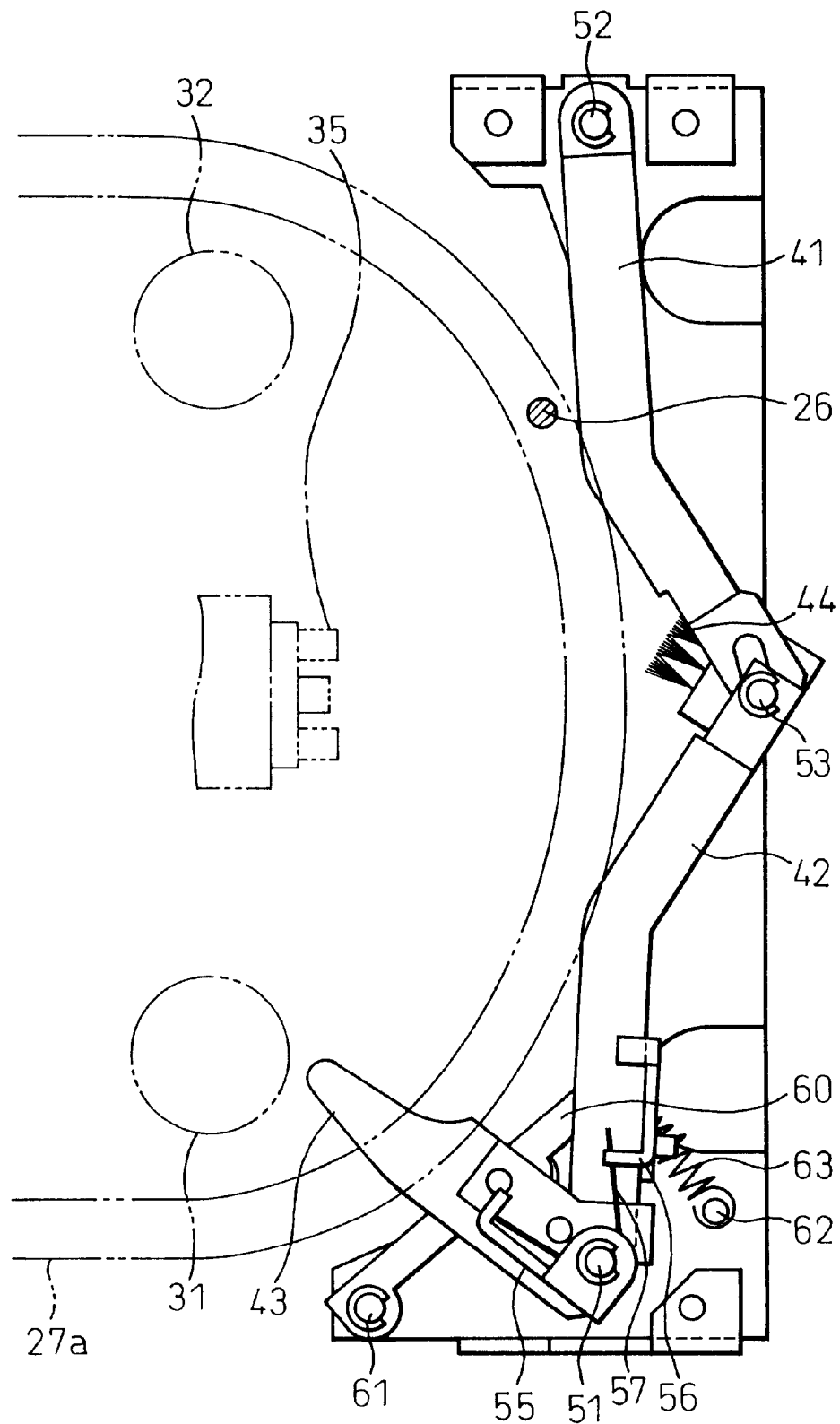
FIG. 9 is a plan view illustrating the cleaning mechanism shown in FIG. 3 in a further operation state.

Then, as the threader pin 26 moves to a position shown in FIG. 7, the roller 65 arrives at the vertex of the triangular prism portion 41a, as shown in FIG. 8. Thereafter, as the threader pin 26 exceeds the position shown in FIG. 7, the first and second arms 41 and 42 move to the retracted position due to the urging force of the pushing arm 60, as shown in FIG. 9. The threader pin 26, on the other hand, advances toward the machine reel 21 along the track 27a so that the leader block is anchored into the groove 21a of the machine reel 21.

Thus, the magnetic tape is wrapped round the magnetic head 35 and the roller guides 31 to 33 and the loading of the magnetic tape is completed. In this state, the brush 44 does not come into slide contact with the magnetic tape; and therefore, the magnetic tape is permitted to run, to carry out reading out data or writing data by the magnetic head 35.

To accommodate the magnetic tape in the cartridge 20 after the data have been read out or written, the leader block is separated from the groove 21a of the machine reel 21 and the magnetic tape is wound in the cartridge 20. At this time, the threader pin 26 moves together with the leader block toward the cartridge 20. At the time of accommodating the magnetic tape in the cartridge 20, a winding-back operation of the magnetic tape, into the cartridge to accommodate it therein, is carried out in a state shown in FIG. 9, and therefore, the threader pin 26 comes in contact with the third arm 43 to push it. As a result, the first arm 41 moves with the third arm and turns counterclockwise.

Due to the rotation of the third arm 43 caused by the threader pin 26, the first and second arms 41 and 42, which move with the third arm 43, return to the approach position shown in FIG. 3, and the brush 44 comes into contact with the magnetic head 35 again. The magnetic tape is then accommodated in the cartridge 20. According to this embodiment, the magnetic head 35 is cleaned not only by bringing the brush 44 into contact with the magnetic head 35 but also by vibrating the head 35 up and down in FIG. 5 in a state where the brush 44 is brought into contact with the magnetic head 35.

Figure 10:
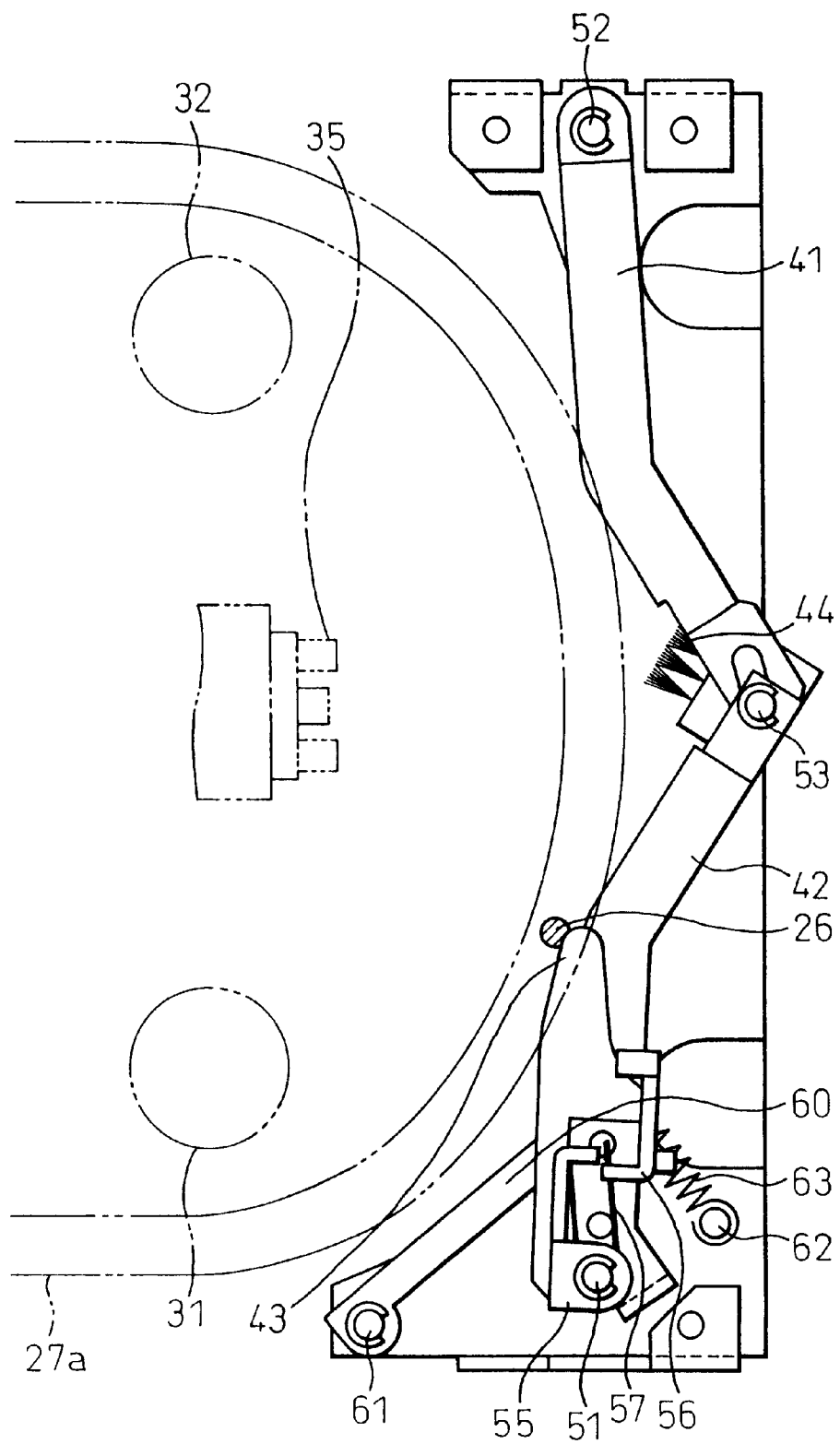
FIG. 10 is a plan view illustrating the cleaning mechanism shown in FIG. 3 in a still further operation state.

If the first and second arms 41 and 42 are at the retracted position and the third arm 43 is intersecting the track 27a due to some cause at the time when the leader block is to be just pulled out from the cartridge 20, the third arm 43 can turn against the urging force of the torsion spring 57, as shown in FIG. 10, so that the threader pin 26 can proceed, pushing the third arm 43, and subsequently allowing it to return to a state shown in FIG. 9. Accordingly, the threader pin 26 arrives at the machine reel 21 without trouble in operation.

Figure 11:
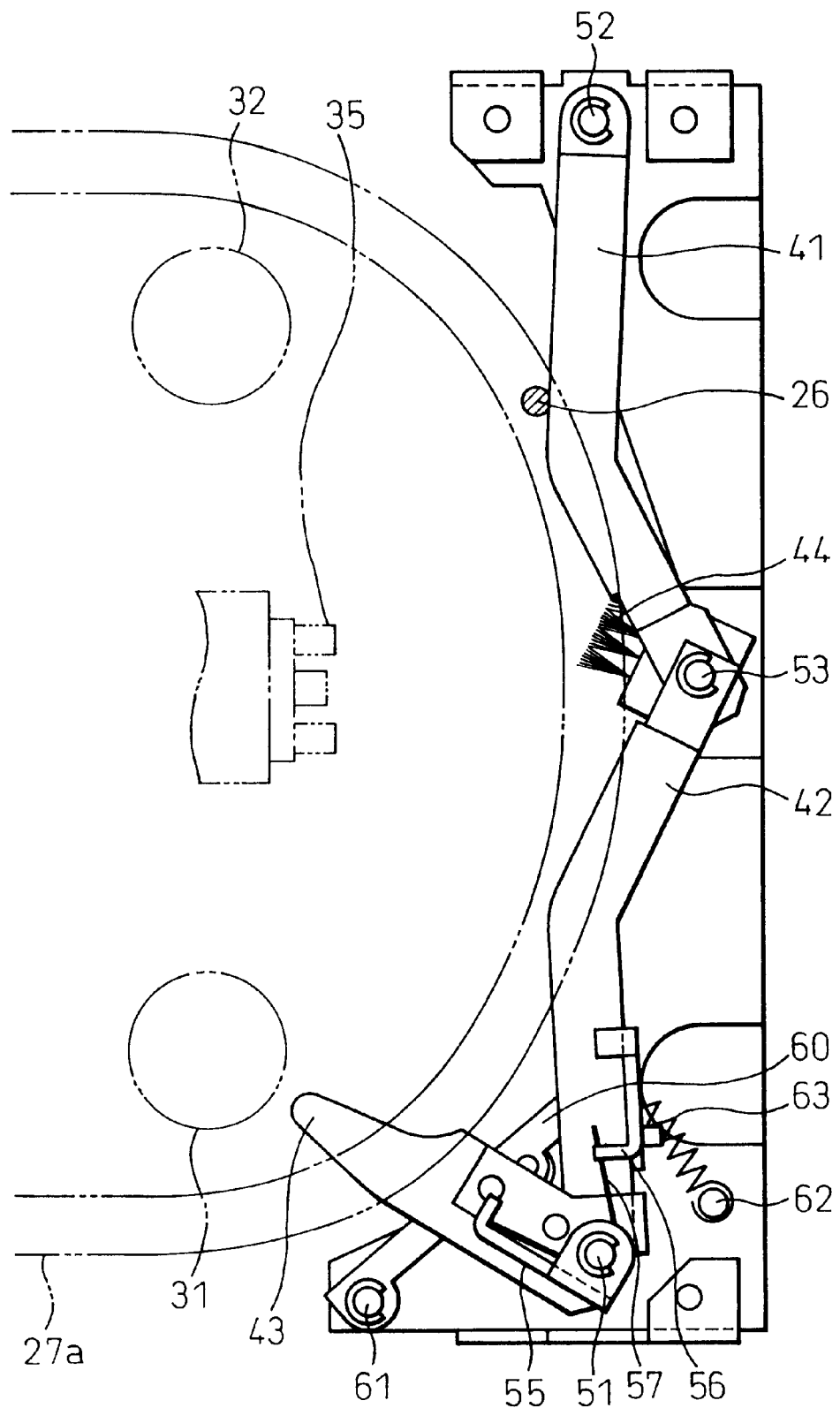
FIG. 11 is a plan view illustrating the cleaning mechanism shown in FIG. 3 in a further operation state.
Figure 12:
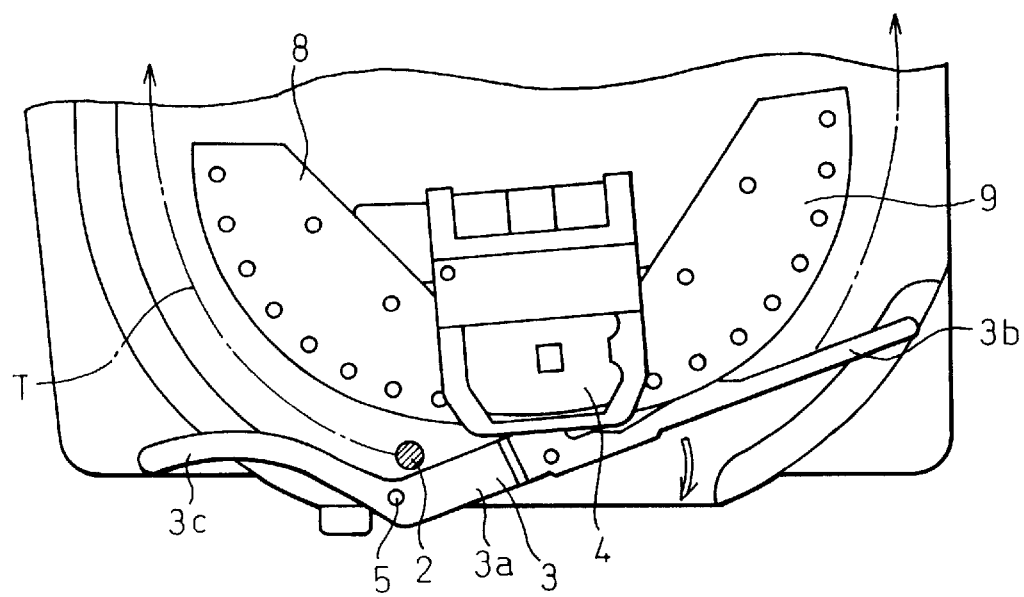
FIG. 12 is a plan view illustrating a cleaning mechanism and a rough arrangement in the vicinity thereof in a conventional magnetic tape apparatus.
Figure 13:
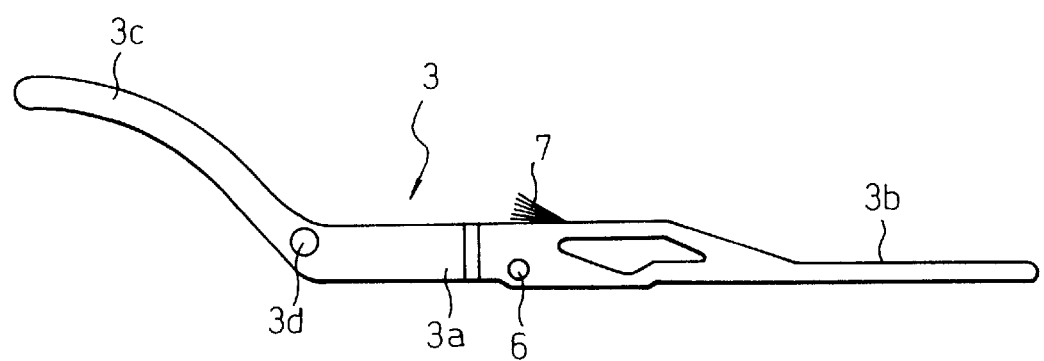
FIG. 13 is a plan view of the swing arm in FIG. 12.

Conversely, if the first and second arms 41 and 42 are at the approach position due to some cause at the time of accommodating the magnetic tape in the cartridge, the threader pin 26 temporarily pushes back the second arm 42 as shown in FIG. 11, and the first and the second arms 41 and 42 move to the retracted position shown in FIG. 9. Thereafter, the threader pin 26 normally operates to arrive at the cartridge 20 without trouble.

According to this embodiment as described above, the centers of rotation of the first arm 41 and the second arm 42 pushed by the threader mechanism 23 are arranged on the side of the cartridge 20 and on the side of the machine reel 21, respectively, relative to the magnetic head 35, and the brush 44 is provided at the rotating end of the first arm 41. Therefore, the amount of movement of the rotating ends of the first and second arms 41 and 42 is nearly the same as the moving amount of the movement of the brush 44. Accordingly, the first and second arms 41 and 42 can move in a small space, and the cleaning mechanism 40 occupy a small space, making it possible to decrease the size of the magnetic tape apparatus.

Since the first arm 41 has a center of rotation at a position over the track 27a relative to the magnetic head 35 and displaced toward the cartridge 20 from the magnetic head 35 in the direction of the track, and the second arm 42 has a center of rotation at a position over the track 27a relative to the magnetic head 35 and displaced toward the machine reel 21 from the magnetic head 35 in the direction of the track, the first and second arms 41 and 42 are permitted to easily intersect the track 27a of the threader mechanism 23, by simply arranging the rotating ends of the first and second arms 41 and 42 in a manner to be opposed to the magnetic heads 35.

Further, since a resilient force is imparted between the first arm 41 and the third arm 43 in a direction to increase the spreading angle between the two, so that the spreading angle between the first arm 41 and the third arm 43 becomes the greatest in a natural state where no external force is given, the third arm 43 reliably follows the movement of the first arm 41.

Basically, the present invention has a feature in the cleaning mechanism 40 in which the centers of rotation of the first arm 41 and the second arm 42 pushed by the threader mechanism 23 are arranged on the side of the cartridge 20 and on the side of the machine reel 21, respectively, relative to the magnetic head 35, and at least one one of the rotating ends of the two arms is provided with the cleaning member such as the brush 44 that comes into contact with the magnetic head 35. Therefore, the concrete constitution of the threader mechanism used in the present invention needs not be limited to that illustrated in the above-mentioned embodiment. Besides, the constitution for urging the first and second arms 41 and 42 toward the approach position or the retracted position, need not be limited to the combination of the pushing arm 60 and the tension spring 63 or the like.

Further, the simultaneous movement of the first arm 41 and the second arm 42 is not limited to the combination of the pin 53 and the elongated hole 42a, and even when the combination of the pin 53 and the elongated hole 42a is used, the elongated hole 42a formed in the rotating end of the second arm 42 needs not be limited to the linear elongated hole 42a extending in the direction of the second shaft 52.

What is claimed is:

1. A magnetic tape apparatus comprising:
    a threader mechanism for pulling out a magnetic tape in a cartridge along a predetermined track and anchoring said magnetic tape to a machine reel;
    a magnetic head for reading data from and writing data into the magnetic tape;
    a first arm having a center of rotation at a position displaced toward said cartridge relative to said magnetic head in the direction of the track, and, upon rotation thereof, being able to assume an approach position where said first arm intersects said track so that a rotating end thereof approaches said magnetic head and a retracted position where said first arm is pushed back in a direction in which said first arm does not intersect said track;
    a second arm having a center of rotation at a position displaced toward said machine reel relative to said magnetic head in the direction of the track, and movable with said first arm to assume an approach position where said second arm intersects said track so that a rotating end thereof approaches said magnetic head and a retracted position where said second arm is pushed in a direction in which said second arm does not intersect said track;
    a cleaning member movable with the rotating ends of said first and second arms and contacting said magnetic head when said first and second arms are at said approach position; and
    said first arm being pushed by said threader mechanism to return back to said retracted position when the magnetic tape is being pulled out from said cartridge.

2. A magnetic tape apparatus according to claim 1, wherein said first arm has the center of rotation at a position over said track relative to said magnetic head and displaced toward said cartridge from said magnetic head in the direction of said track, and said second arm has the center of rotation at a position over said track relative to said magnetic head and displaced toward said machine reel from said magnetic head in the direction of said track.

3. A magnetic tape apparatus comprising:
    a threader mechanism for pulling out a leader block of a magnetic tape in a cartridge by a threader arm along a predetermined track and anchoring said magnetic tape to a machine reel;
    a magnetic head for reading data from and writing data into the magnetic tape;
    a first arm having a center of rotation at a position over said track relative to said magnetic head and displaced toward said cartridge from said magnetic head in the direction of the track, and, upon rotation thereof, being able to assume an approach position where said first arm intersects said track so that a rotating end thereof approaches said magnetic head and a retracted position where said first arm is pushed back in a direction in which said first arm does not intersect said track, said first arm being pushed by said threader arm to return to said retracted position when the magnetic tape is being pulled out from said cartridge;
    a second arm having a center of rotation at a position over said track relative to said magnetic head and displaced toward said machine reel from magnetic head in the direction of the track, having a rotating end engaged with the rotating end of said first arm to move with said first arm, and being able to assume an approach position where said second arm intersects said track so that the rotary end thereof approaches said magnetic head and a retracted position where said second arm is pushed back in a direction in which said second arm does not intersect said track;

a third arm which is located at a position to intersect a portion of said track on the side of said cartridge rather than first arm when said arm is at said retracted position, and is pushed and displaced by said threader arm so that this movement is transmitted to said first arm to move said first arm to said approach position when the magnetic tape is accommodated in said cartridge; and a cleaning member provided on the rotating end of at least one of said first arm and said second arm to come into contact with said magnetic head when said first and second arms are at said approach position.

4. A magnetic tape apparatus according to claim 3, wherein said first and third arms have centers of rotation that are in agreement with each other and are arranged in a V-shape, a spreading angle between said first arm and said third arm being limited in a predetermined range, said third arm rotating by receiving a force from said threader arm in a direction to broaden the spreading angle relative to said first arm when said magnetic tape is to be accommodated, so that said first arm is moved to said approach position.

5. A magnetic tape apparatus according to claim 4, wherein a resilient force is imparted between said first arm and said third arm in a direction to increase the spreading angle between said first arm and said third arm, so that the spreading angle between said first arm and said third arm becomes a maximum in a natural state where no external force is exerted.

* * * * *

UNITED STATES PATENT AND TRADEMARK OFFICE
CERTIFICATE OF CORRECTION

PATENT NO.     : 6,208,488 B1
DATED          : March 27, 2001
INVENTOR(S)    : Yamakawa et al.

It is certified that error appears in the above-identified patent and that said Letters Patent is hereby corrected as shown below:

Column 10,
Line 29, insert -- back -- between "pushed" and "in".

Signed and Sealed this

Third Day of June, 2003

JAMES E. ROGAN
*Director of the United States Patent and Trademark Office*